UNITED STATES PATENT OFFICE.

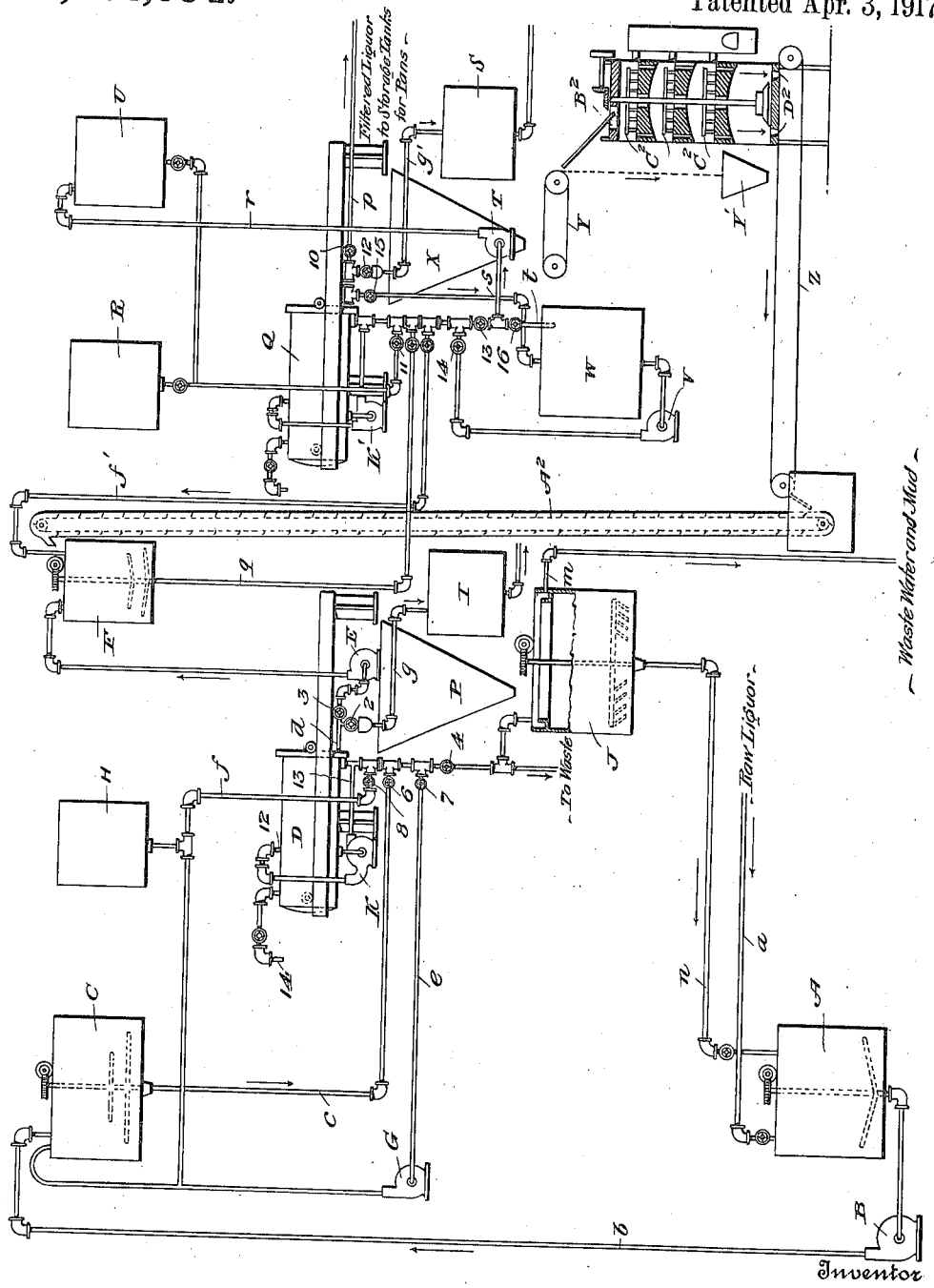

JASPER A. McCASKELL, OF SALT LAKE CITY, UTAH.

PROCESS OF REFINING SUGAR LIQUOR.

1,221,554.            Specification of Letters Patent.            Patented Apr. 3, 1917.

Application filed August 17, 1915, Serial No. 45,901. Renewed February 5, 1917. Serial No. 146,849.

*To all whom it may concern:*

Be it known that I, JASPER A. McCASKELL, a citizen of the United States, residing at Salt Lake City, in the county of Salt Lake and State of Utah, have invented certain new and useful Improvements in Processes of Refining Sugar Liquor, of which the following is a specification.

My invention relates to a process for clarifying or refining raw, whole or partially refined sugar juices or liquors, and the invention consists of the steps and the order or succession of steps constituting the process which I will hereinafter describe and claim.

In the accompanying drawing the figure illustrates to some extent diagrammatically, one embodiment of apparatus by which my process may be carried out.

The apparatus shown comprises a suitable tank or tanks, A, adapted to contain a mixture of sugar-liquor and bone-char, said tank or tanks having a pipe, $b$, for delivering the solution into a tank, C. In the pipe line, $b$, is a suitable pump, B, for assisting the flow of the mixture of sugar-liquor and bone-char through the pipe to the receiving tank, C.

In the receiving tank is mounted a suitable agitator and connecting with the bottom of this tank is a pipe, $c$, which connects with the bottom of a pressure-filter tank, D, of any suitable construction, such for instance, as is disclosed in the Kelly Patent Number 815,021, dated March 13, 1906, and others of a similar nature, which are so well known that a detailed showing of the same is unnecessary.

The filter tank has a pipe, 12, leading from its upper end and connecting with a pump, K, the outlet of which is connected by a suitable pipe line, 13, to the bottom of the forward end of the pressure tank, whereby a continuous circulation of the solution with which the pressure tank is charged may be maintained.

The pressure tank also has a suitable valve-controlled overflow pipe, 14, leading from its upper end and which permits the escape of air which is displaced when filling the tank with the aforesaid solution.

The filter tank contains as usual suitable filter leaves or frames, not shown, and from each of these leads a pipe, $d$, through which the clear filtrate may be discharged.

The apparatus further comprises a wash-water tank, H, which through a suitable pipe line, $f$, is connected to the filter press, D; also a storage tank, F, for filtered liquor, which is received from the pipe $d$, connecting with the interior of the filter frames or leaves, in the manner common to filter presses of the type described, and which clear liquor is delivered to the tank, F, through the agency of a suitable pump, E, and a discharge pipe therefrom.

There is also a receiver or hopper, P, into which the filter press discharges its contained cake after the same has been washed and is ready for discharge, which hopper or receiver is in communication with a tank, J, in which operates a suitable agitator for stirring up the contents of this tank, thereby washing out the mud constituent of the cake and facilitating the separation by gravity of the lighter from the heavier particles of the filter cake, the aforesaid separatory tank, J, being connected by a suitable pipe line, $n$, with the mixing tank, A, before mentioned.

I is a sweet-water tank connecting by pipe, $g$, with the pipe, $d$, leading from the interior of the filter frames. The purpose of this tank and those heretofore mentioned and to be referred to, together with the various pipe-lines and means for controlling the flow of fluid through the same, will be more readily understood from the following description of the operation of my process, although it will be understood that I do not limit my process to the type of apparatus shown or in fact to any particular apparatus, but I intend that any and all types of apparatus wherein the process may be successfully carried out shall come within the scope of my invention.

The storage tank, F, is also connected by an appropriate pipe-line, $f'$, with a second filter-press, Q, similar to the one before mentioned, so that the solution of said tank, F, may be filtered in this second filter-press substantially in the manner described for the press, D, and the clear filtrate delivered through pipe, $p$, to storage tanks for conversion into white sugar.

The circulation of the solution admitted to the filter-press, Q, is maintained during the filtering operation by means of a pump, K', and suitable pipe connections.

A wash water tank, R, is connected to the filter-press, Q, so that cakes built upon the frame of this filter-press may be washed, as in the manner before described, to remove any remaining traces of sugar solution, and the filtrate of this operation is delivered to a sweet-water tank, S, through a pipe, $g'$. The excess water in the press, Q, is in turn sent to a storage tank, U, by being drawn through pipe, $r$, and forced into the latter tank, through the medium of the pump, T.

In order that the cake composed of bone-char and foreign matter, which is formed upon the filter-frames in the pressure tank, Q, may be washed with a solution of caustic soda, I employ a tank, W, from which the caustic soda may be pumped by pump, V, into said press. The excess caustic soda may be drained from the casing of the press back into the aforesaid tank, W, through a suitable pipe-line.

X is a hopper into which the cakes formed in the filter-press, Q, may be discharged and this hopper has its bottom communicating with a conveyer, Y, adapted to convey the deposited material into a retort, $B^2$, of any suitable character, where the bone-char is revivified, and the revivified char is delivered from the retort onto a conveyer, Z, which in turn delivers to an elevator, $A^2$, for conveying the revivified bone-char back to the storage tank, F, where it is mixed with the filtered sugar liquor of this tank.

In operating the process, the raw-sugar liquor is admitted to the tank, A, through the pipe, $a$, where it is mixed with a proper proportion of bone-char and is continually agitated by means of a suitable stirrer within said tank. After the bone-char and liquor have been thoroughly mixed the solution is sent through the pump, B, and pipe, $b$, to the storage tank, C, where it is continually agitated and the bone-char kept in suspension by a suitable paddle or agitating means with which the tank is supplied. From this tank, C, the solution is run through pipes, $c$, to the filter-press, D, which operation may be accomplished by opening a valve, 6, and in the filter-press the sugar liquor is filtered, the clear liquid being drawn out through the pipe, $d$, and thence delivered to the pump, E, by opening valve, 3, and closing valve, 2, said pump delivering this filtered liquor to the storage tank, F. The bone-char and the mud and gums or foreign matter contained in the sugar-liquor, are retained on the surface of the usual filter leaves and form a cake of filtering medium, as before described. After the requisite amount of liquid has been filtered, the excess is withdrawn from the filter-press through the pipe, $e$, by opening a valve, 7, and said liquor is sent back to the storage tank, C, by means of the pump, G. Water is now admitted to the press from the fresh-water tank, H, by opening the valve, 8, in the pipe-line, $f$, and the char-cake is "sweetened off" or washed to remove the remaining traces of sugar solution, which may be done by closing the valve, 3, in the filtrate pipe, $d$, and opening the valve, 2, controlling the passage through the pipe, $g$, leading to the sweet water tank, I. The excess water in the filter-press, D, may now be drained into the tank, J, or it may be run to waste by opening a suitable valve, 4. After draining out the excess water the press is opened and the cake discharged into the hopper, P, and from there it is sent into the tank, J, wherein the material is agitated and the char thoroughly washed and the muds, gums and other lighter foreign matter are separated by floating off through a pipe, $m$, while the heavier matter, namely, the bone-char settles in the tank and is delivered therefrom through the pipe, $n$, to the tank, A, where it is mixed with a proper proportion of raw-sugar liquor admitted through the pipe, $a$, thus completing the circuit. In the method so far described no attempt has been made to fully decolorize the sugar liquor. The char has been used simply to catch the coarser foreign matter that is contained in the raw sugar liquor and to increase the rate of filtration.

The clarified filtered liquor which has been obtained in the foregoing operation and stored in the tank, F, is now mixed with a proper proportion of new char, and the intimate mixing of this char with the said sugar liquor is effected by means of a paddle or appropriate stirrer in said tank. This char and filtered sugar-liquor when properly mixed is run into the second filter-press, Q, through the pipe-line, $q$, where the solution is again filtered and the decolorized filtrate resulting from the operation of this press is delivered through the pipe, $p$, by opening a valve, 10, said decolorized filtrate being sent to storage tanks for use in evaporating pans. This solution obtained from the tank, F, in passing through the char a second time or more, is thus decolorized and the filtrate is then in a proper condition in which to make white sugar. After sufficient liquor has been filtered, the char cake in the press is "sweetened off" by admitting water from the tank, R, into the filter press, Q, by opening a valve, 11, and the sweet water from this "sweetening off" stage of the process is delivered through pipe, $p$, to pipe, $g'$, by opening the valve, 12, and finally is sent to the sweet-water storage tank, S. The excess water is now drawn from the filter press, Q, through the pipe, $r$, by opening valve, 13, and this water pumped back to the storage tank, U, by means of a pump, T.

The cake, composed largely of bone-char, which has been formed on the filter frames contained in the press, Q, may now be washed with a solution of caustic soda which is delivered to the filter press under pressure by means of the pump, V, which is in the pipe-line connecting the caustic soda tank, W, with said press, a valve, 14, in this pipe line controlling the passage of the caustic soda solution through this pipe-line, and the caustic soda solution, after performing its washing and revivifying function upon the cake, is returned to the tank, W, through the pipes, $p$ and $s$, by opening valve, 15. The excess caustic soda solution is drained out of the press, Q, through the pipe, $t$, into the tank, W, by opening the valve, 16. The char is then washed with water to rid it of caustic solution.

Having thus washed the cake, the filter press casing is opened and the filter frames are removed, which may be done in the manner described in the aforesaid patent, and the char-cake is dumped into the hopper, X, and onto a conveyer, Y, and thence delivered into a hopper, Y', which in turn delivers the char onto a conveyer, Z, from whence it is conducted back to the sugar-liquor storage tank, F, through the medium of the interposed elevator, $A^2$.

If desired the step of washing with the caustic soda solution may be omitted, and the cake which has been built in the second filter-press then discharged into the hopper, X, and delivered upon the conveyer, Y, and is sent to a retort, $B^2$, where it is revivified and is raked from one hearth to the next by revolving arms, $C^2$. From the retort the revivified char is delivered through hoppers, $D^2$, to the conveyer, Z, and from the latter it is delivered to the elevator, $A^2$, and sent back to the storage tank, F, where it is mixed with the proper proportion of filtered sugar-liquor derived from the first filter press D, thus making a closed circuit of this char.

In the process described, two lots of char are used, one lot being employed only in the clarifying operation for removing the coarser suspended matter and the other lot being used only in the decolorizing operation for removing the remaining finer suspended matter. Some advantage is claimed for this latter operation, and although more machinery may be needed there occurs the advantage of keeping the decolorizing char absolutely free from any foreign material.

While I have referred to this invention as being primarily intended for the treatment of sugar-liquor, the process described may be used for similar refining and chemical purposes; for instance, in oil refining in which the same sequence of operations can be carried on with equally as great a saving as has been demonstrated in the filtering of sugar liquor. Because of this it is not my purpose to limit the present invention to the treatment of sugar solution only, but I intend that the process shall apply to the filtering and refining of any solution which may be successfully treated by the process described.

Having thus described my invention what I claim as new and desire to secure by Letters Patent is:—

The process substantially as herein described of filtering and decolorizing sugar-liquor, said process consisting, essentially, in mixing bone-char having a specific gravity greater than that of the foreign material in said liquid with original sugar-liquor and filtering the mixture to separate the liquid content thereof from the bone-char; then washing the filter cake of bone-char in its filtering position to remove remaining traces of the sugar liquor; then separating the bone-char from the associated foreign agent of the cake by agitation and by the difference in the specific gravity of the bone-char and said foreign matter, and adding the separated bone-char to another portion of original sugar-liquor to be filtered; then adding another charge of bone-char to the separated filtrate obtained from the said filtering operation and filtering the mixture to obtain a decolorized filtrate and a filter cake composed of the added bone-char; washing the cake in its filtering position to remove remaining traces of the sugar-liquor; revivifying the bone-char; and finally, adding the revivified bone-char to another portion of the filtered sugar-liquor to be decolorized.

In testimony whereof I affix my signature in presence of a witness.

JASPER A. McCASKELL.

Witness:
HARRY E. CORSER.